Jan. 31, 1956 H. D. BREEN 2,732,812
POWER TAKE OFF DRIVE
Filed Aug. 5, 1953 2 Sheets-Sheet 1
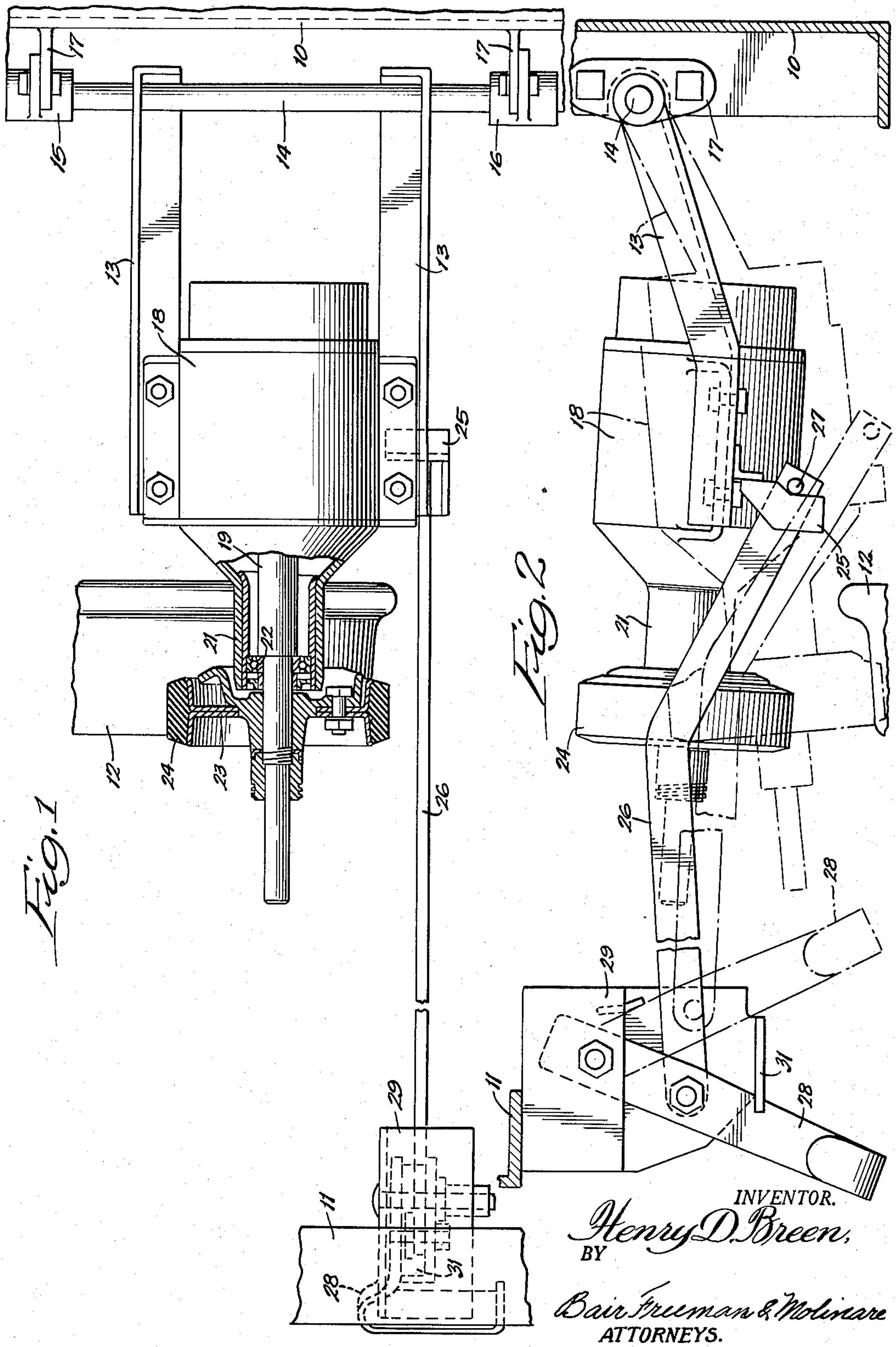

POWER TAKE OFF DRIVE
Filed Aug. 5, 1953 2 Sheets-Sheet 2
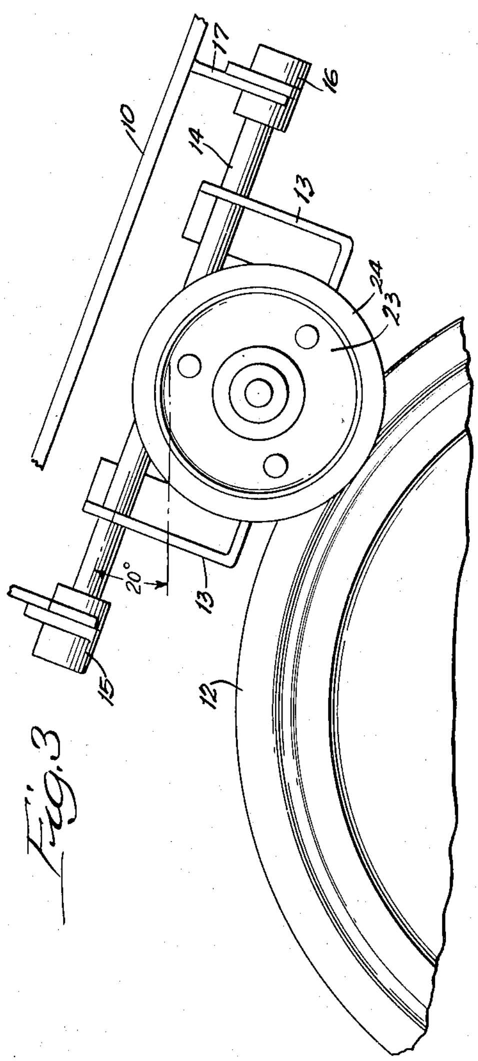
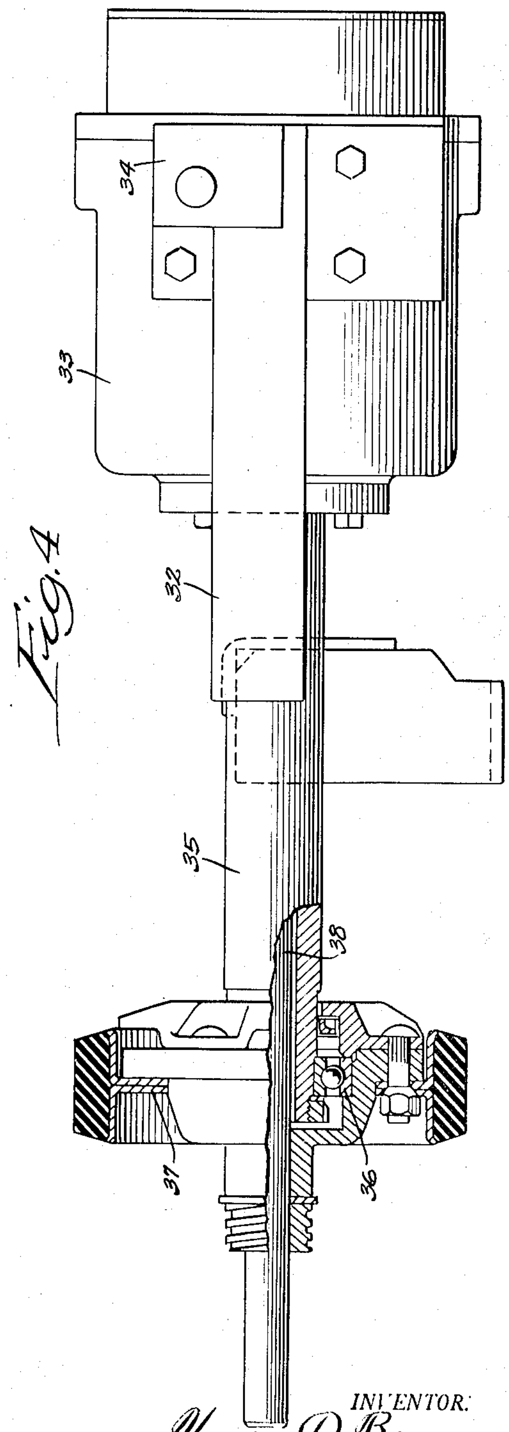
INVENTOR:
Henry D. Breen
BY
Bair Freeman & Molinare
ATTORNEYS.

United States Patent Office 2,732,812 Patented Jan. 31, 1956

2,732,812

POWER TAKE OFF DRIVE

Henry D. Breen, Chicago, Ill., assignor to Union Asbestos & Rubber Co., Chicago, Ill., a corporation of Illinois Application August 5, 1953, Serial No. 372,570

10 Claims. (Cl. 105—114)

This invention relates to power take off drives and more particularly to the mounting of a take off drive roller for driving engagement with a railway car wheel.

In the use of power take off drive rollers for operating accessories on railway cars, difficulty has been encountered in mounting the roller so that it will properly follow movement of the wheel as the truck turns in negotiating curves and in maintaining proper driving pressure between the roller and the wheel. It is also highly desirable in such mechanisms to be able to latch the roller out of engagement with the wheel when no take off power is desired.

It is one of the objects of the present invention to provide a power take off drive in which the roller is mounted very simply to follow accurately movement of the wheel as the truck turns.

Another object is to provide a take off drive in which simple and easily accessible latch means are provided to latch a roller in its inoperative position.

A further object is to provide a take off drive in which the roller is directly carried by a generator whose weight is effective to hold the roller in proper engagement with the wheel.

According to one feature of the invention, the roller and generator are supported for pivotal movement about an axis at an angle to horizontal to produce the desired movements of the roller and to provide the desired component of the generator weight acting on the roller.

The above and other objects and features of the invention will be more readily apparent from the following description when read in connection with the accompanying drawings in which Figure 1 is a partial plan view with parts in section of a power take off drive embodying the invention;

Figure 2 is a side view;

Figure 3 is a partial end elevation showing engagement of the drive roller with the car wheel, and Figure 4 is a partial side view with parts in section of an alternative construction.

The power take off drive, as shown in Figures 1 to 3, is adapted to be mounted on a conventional railway car having a center beam or sill 10 and a side beam or sill 11 at one side thereof. The car is supported in the usual manner on trucks which are pivotally connected to the car for rotation about vertical axes adjacent to the center of the car width and each of which carries a pair of axles extending transversely of the car and supported on wheels, one of which is partially shown at 12.

The power take off drive of the present invention comprises a frame formed by a pair of bars 13 mounted in spaced parallel relationship and secured to a pivot pin 14. The pin 14 is supported for rotation in bearings 15 and 16 which are secured through brackets 17 to the center beam or sill 10. As best seen in Figure 2, the bars 13 are bent so that their outer free ends lie at a level below the level of the pivot pin 14.

The frame is adapted to carry directly an electric generator indicated generally at 18 and which may be directly secured to the offset free ends of the bars 13. The generator has a main driving shaft 19 extending lengthwise of the frame and rotatable about an axis passing below the pivot pin 14, as best seen in Figures 2 and 3.

The generator shaft extends through an elongated tubular projection 21 on the generator casing and is supported by a bearing 22 near the outer end of the extension. Closely adjacent to the end of the extension, the shaft 19 carries a power take off roller 23 which is preferably provided with a tread 24 of rubber, or the like, adapted to engage the surface of the wheel 12. With this construction, the shaft is adequately supported and bending moments thereon due to pressure on the roller are minimized.

According to one of the important features of the present invention, the pivot pin 14 extends generally parallel to the center beam 10, but lies at an acute angle to the horizontal. This angle may be varied for different types of installations as desired, but I have found that for most purposes an angle of approximately twenty degrees, as indicated in Figure 3, is satisfactory. In addition, the frame is so positioned that the roller 23 will engage the wheel 12 at a point spaced from its top center in the same direction as the low end of the pivot pin 14.

In operation, when the wheel is in a position for straight ahead travel, the parts will occupy the positions and relationships indicated in Figures 1 and 3. When the truck turns to move the wheel forward from the position illustrated in Figure 3, the roller will ride up on the wheel and will be elevated to swing the frame about the pivotal axis 14. In this direction of turning of the truck, the wheel will swing outward from the center of the car and the roller will follow an arcuate path about the pivot pin 14 which will cause it to swing outward from the center of the car to the position shown in full lines in Figure 2. Thus the roller will accurately follow movements of the wheel and will be maintained in proper driving contact with the wheel.

Upon turning of the truck in the opposite direction, the roller will swing down to a position, as shown in dotted lines in Figure 2. At this time, the wheel will tend to swing inward toward the center of the car and the roller will move inward so that it will maintain its driving contact with the wheel.

It will be noted that since the roller is directly connected to the generator which is in turn supported on the pivoted frame, the weight of the generator and frame will tend to press the roller into driving engagement with the wheel. If the full weight of the generator were applied to the roller, the driving pressure would be greater than that desired with the result that the roller would wear rapidly. Due, however, to the angle of the pivot pin 14 a portion of the weight of the generator will be carried by the pivot pin leaving only the vertical component of the resultant of forces about the pivot pin to act on the roller. Thus the pressure between the roller and the wheel is reduced to a value within the desired range so that the roller will be held in proper driving contact without being worn excessively due to excessive pressure. The angular arrangement of the pivot pin also reduces the thrust on the roller which occurs when the truck turns thereby reducing the load on the bearings.

Under many conditions, it is desirable to hold the roller out of engagement with the wheel, as when the accessories driven by the power take off drive are not to be operated. For this purpose a bracket 25 is mounted at one side of the frame and slidably receives a latching bar 26. The bar 26 can slide inward through the bracket, but its outward movement relative to the bracket is limited by a pin 27 on the bar which will engage the bracket.

At its free end, the bar 26 is pivoted to a latch arm 28 which is pivoted to the side sill 11 of the car at a level above the level of the bracket. The latch arm 28 is guided by a latch bracket 29 having a lower flange 31 formed with a notch in its outer edge to receive the latch arm 28. When the latch arm is swung to its full line position, as seen in Figure 2, it will pull the latch bar 26 to the left until the pin 27 engages the bracket 25 and upon further tension of the latch bar will raise the frame, generator and roller to the full line position shown in Figure 2. At this time, the latch arm 28 will engage the notch in the shoulder 31 so that parts will be latched in elevated position with the roller out of engagement with the wheel. When the latch arm 28 is released and moved to the right, as shown in dotted lines in Figure 2, the frame and generator roller assembly will swing down by gravity until the roller engages the wheel.

Figure 4 illustrates the construction modified slightly with respect to Figure 3 in the details of the frame and generator mounting. In this construction, the frame comprises side rails 32 lying on opposite sides of and secured to a generator 33. Closely adjacent to the center of gravity of the generator, the rails 32 carry brackets 34 which may be pivotally connected to pivot pins corresponding to the pin 14.

The generator casing includes an elongated sleeve portion 35 projecting beyond the frame and carrying a bearing 36 on which the drive roller 37 is journalled. The generator shaft 38 extends through the sleeve and is secured to a hub on the drive roller beyond the end of the sleeve. In this construction, the shaft 38 takes no bending moments and the driving pressure on the roller may be made relatively light since the center of gravity of the generator lies close to its pivotal mounting so that its effect on the roller is minimized. Otherwise, this construction may be substantially the same as that of Figures 1 to 3 and may function in the same manner.

While one embodiment of the invention has been shown and described in detail, it will be understood that this is illustrative only and is not to be taken as a definition of the scope of the invention, reference being had for this purpose to the appended claims.

What is claimed is:

1. A power take off drive for a railway car having a wheel carried by an axle extending transverse to the car length and swingable about a vertical axis adjacent to the center of the car and a car body supported by the axle comprising an elongated frame, a pivot mounting supporting one end of the frame on the car body for pivotal movement about an axis extending generally longitudinally of the car and lying above the axle at an acute angle to horizontal with its other end above and in registry with the wheel, a power take off roller, and means carried by the frame and supporting the power take off roller adjacent to the other end of the frame for driving engagement with the upper part of the wheel.

2. A power take off drive for a railway car having a wheel carried by an axle extending transverse to the car length and swingable about a vertical axis adjacent to the center of the car and a car body supported by the axle comprising an elongated frame, a pivot mounting supporting one end of the frame on the car body for pivotal movement about an axis extending generally longitudinally of the car and lying above the axle at an acute angle to horizontal with its other end above and in registry with the wheel, a power take off roller, and means carried by the frame and supporting the power take off roller adjacent to the other end of the frame for driving engagement with the upper part of the wheel, the roller normally engaging the wheel at a point spaced from its top center in the same direction as the low end of the pivotal axis.

3. A power take off drive for a railway car having a wheel carried by an axle extending transverse to the car length and swingable about a vertical axis adjacent to the center of the car and a car body supported by the axle comprising an elongated frame, a pivot mounting supporting one end of the frame on the car body for pivotal movement about an axis extending generally longitudinally of the car and lying above the axle at an acute angle to the horizontal with its other end above and in registry with the wheel, a power take off roller, and means carried by the frame and supporting the power take off roller adjacent to the other end of the frame for driving engagement with the upper part of the wheel, the roller normally lying at a level below the point at which a vertical plane through the roller axis intersects the pivotal axis of the frame and engaging the wheel at a point displaced from its top center in the same direction as the low end of the pivotal axis.

4. A power take off drive for a railway car having a wheel carried by an axle extending transverse to the car length and swingable about a vertical axis adjacent to the center of the car and a car body supported by the axle comprising an elongated frame, a pivot mounting supporting one end of the frame on the car body for pivotal movement about an axis extending generally longitudinally of the car and lying above the axle at an acute angle to horizontal with its other end above and in registry with the wheel, a power take off roller, and means carried by the frame and supporting the power take off roller adjacent to the other end of the frame for driving engagement with the upper part of the wheel, a bracket carried by the frame adjacent to said other end thereof, an elongated bar, means connecting one end of the bar to the car at a point beyond said other end of the frame and above the normal level of the bracket for shifting movement lengthwise of the frame, a part on the other end of the bar to engage the bracket and raise the roller above the wheel when the bar is moved away from the frame and latch means to hold the bar in its moved position.

5. A power take off drive for a railway car having a wheel carried by an axle extending transverse to the car length and swingable about a vertical axis adjacent to the center of the car and a car body supported by the axle comprising an elongated frame, a pivot mounting supporting one end of the frame on the car body for pivotal movement about an axis extending generally longitudinally of the car and lying above the axle at an acute angle to horizontal with its other end above and in registry with the wheel, a generator carried by the frame and and having a shaft extending lengthwise of the frame, and a drive roller secured to the generator shaft for driving engagement with the upper part of the wheel.

6. A power take off drive for a railway car having a wheel carried by an axle extending transverse to the car length and swingable about a vertical axis adjacent to the center of the car and a car body supported by the axle comprising an elongated frame, a pivot mounting supporting one end of the frame on the car body for pivotal movement about an axis extending generally longitudinally of the car and lying above the axle at an acute angle to horizontal with its other end above and in registry with the wheel, a generator carried by the frame and having a shaft extending lengthwise of the frame at a level below the pivot mounting, and a drive roller carried by the generator shaft and normally engaging the wheel at a point spaced from its top center in the same direction as the low end of the pivotal axis of the frame.

7. A power take off for a railway car comprising a car body, a truck pivotally connected to the car body adjacent to the center of its width, an axle carried by the truck, a rail engaging wheel on the axle, an elongated frame pivoted on the car body adjacent to the center of its width on an axis extending lengthwise of the car body at an acute angle to horizontal the frame lying above the axle and the wheel, a roller, and means carried by the frame and supporting the power take off roller adjacent to the frame for driving engagement with the upper part of the wheel.

8. A power take off for a railway car comprising a car body, a truck pivotally connected to the car body adjacent to the center of its width, an axle carried by the truck, a rail engaging wheel on the axle, an elongated frame pivoted on the car body adjacent to the center of its width on an axis extending lengthwise of the car body at an acute angle to horizontal the frame lying above the axle and the wheel, a roller, and means carried by the frame and supporting the power take off roller adjacent to the frame adjacent to its free end for driving engagement with the upper part of the wheel, a bracket secured to the frame adjacent to its free end, a bar extending slidably through the bracket and having a projecting part to engage the bracket and elevate the frame to raise the roller from the wheel, and latch means connecting the bar to the car body adjacent to the side thereof to latch the bar in its roller raising position.

9. A power take off for a railway car comprising a car body, a truck pivotally connected to the car body adjacent to the center of its width, an axle carried by the truck, a rail engaging wheel on the axle, an elongated frame pivoted on the car body adjacent to the center of its width on an axis extending lengthwise of the car body at an acute angle to horizontal the frame lying above the axle and the wheel, a generator carried by the frame and having a shaft extending lengthwise of the frame at a level below the pivotal axis of the frame and a drive roller secured to the shaft for driving engagement with the upper part of the wheel.

10. A power take off for a railway car comprising a car body, a truck pivotally connected to the car body adjacent to the center of its width, an axle carried by the truck, a rail engaging wheel on the axle, an elongated frame pivoted on the car body adjacent to the center of its width on an axis extending lengthwise of the car body at an acute angle to horizontal the frame lying above the axle and the wheel, a generator carried by the frame and having a shaft extending lengthwise of the frame at a level below the pivotal axis of the frame and a drive roller secured to the shaft for driving engagement with the upper part of the wheel at a point spaced from the top center of the wheel in the same direction as the lower end of the pivotal axis of the frame.

References Cited in the file of this patent

UNITED STATES PATENTS 2,275,166 Bancroft ---------------- Mar. 3, 1942
2,567,504 Beemer ---------------- Sept. 11, 1951